(12) United States Patent
Abate et al.

(10) Patent No.: US 8,922,971 B2
(45) Date of Patent: Dec. 30, 2014

(54) INTEGRATED BI-POLAR IONIZATION AIR PURIFICATION FOR FAN-POWERED AIR DISTRIBUTION DEVICES

(71) Applicant: Clean Air Group, Inc., Fairfield, CT (US)

(72) Inventors: Anthony M. Abate, Seymour, CT (US); Michael Tsekhansky, Hamden, CT (US); Carlos Gendron, Stamford, CT (US)

(73) Assignee: Clean Air Group, Inc., Fairfield, CT (US)

( * ) Notice: Subject to any disclaimer, the term of this patent is extended or adjusted under 35 U.S.C. 154(b) by 171 days.

(21) Appl. No.: 13/739,842

(22) Filed: Jan. 11, 2013

(65) Prior Publication Data

US 2013/0182364 A1    Jul. 18, 2013

Related U.S. Application Data

(60) Provisional application No. 61/586,399, filed on Jan. 13, 2012.

(51) Int. Cl.
*H01T 23/00*    (2006.01)
*F24F 3/16*    (2006.01)

(52) U.S. Cl.
CPC .......... *F24F 3/166* (2013.01); *F24F 2003/1682* (2013.01)
USPC .......................................... 361/231; 361/230

(58) Field of Classification Search
USPC ................................................... 361/230, 231
See application file for complete search history.

(56) References Cited

U.S. PATENT DOCUMENTS

2006/0288871 A1* 12/2006 Crapser et al. .................... 96/52
2011/0171094 A1* 7/2011 Zahedi ....................... 423/245.1

* cited by examiner

*Primary Examiner* — Danny Nguyen
(74) *Attorney, Agent, or Firm* — Abelman, Frayne & Schwab

(57) ABSTRACT

An indoor located air distribution device for providing distribution of purified supply air to a service area. The air distribution device with air purifier can reduce the amount of bacteria, viruses, and bad spores inside the service area, can minimize the spreading of bacteria, viruses and spores, and can create overall healthier conditions in the service area. With low energy usage and maintenance cost, an air supply unit with built-in bi-polar air purifier can improve the quality of room breathable air, minimize the amount of outside air in total supply air, and decrease the usage of energy (heating/cooling) and electricity.

13 Claims, 5 Drawing Sheets

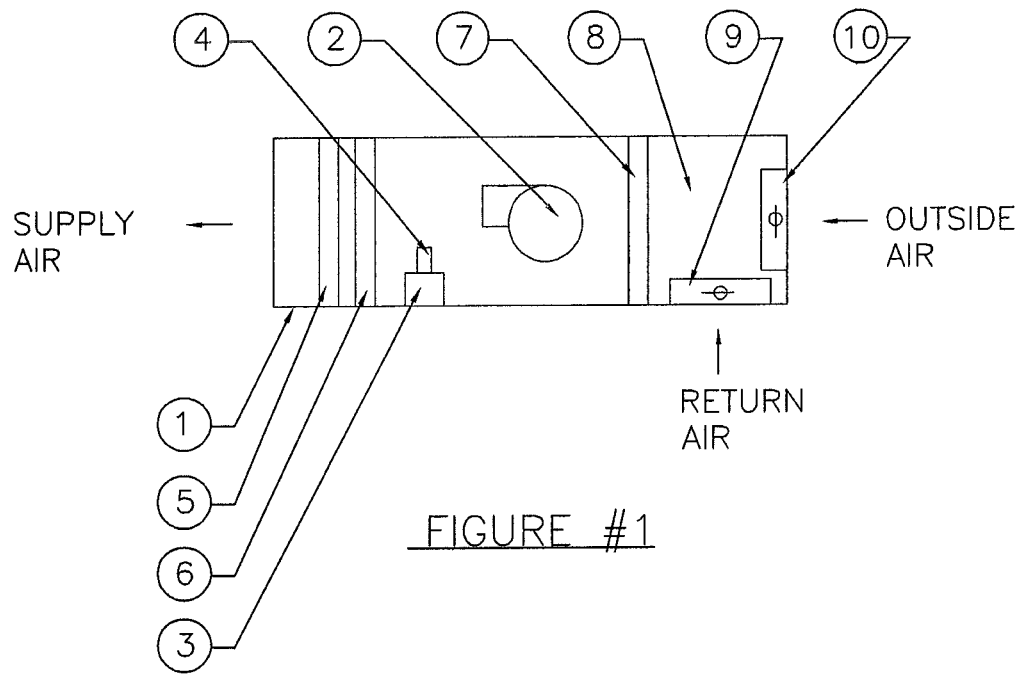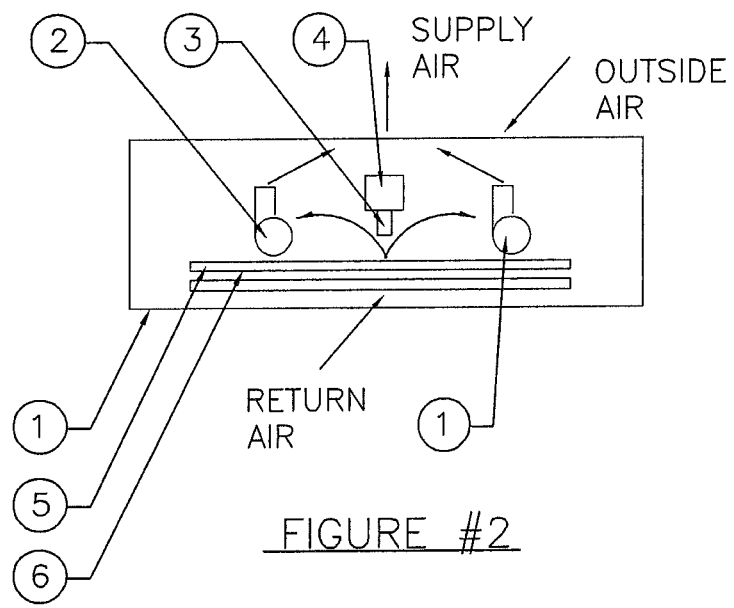

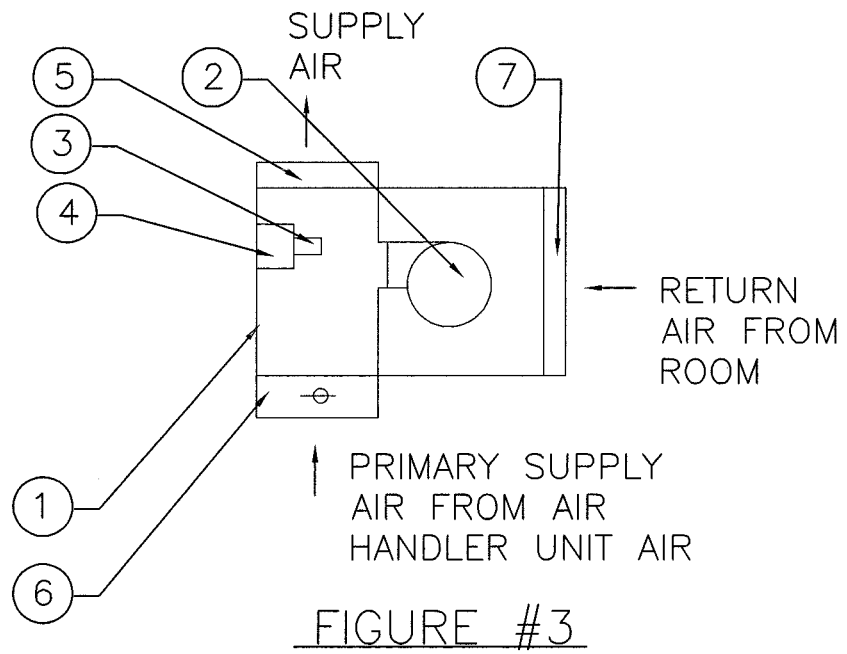
FIGURE #3
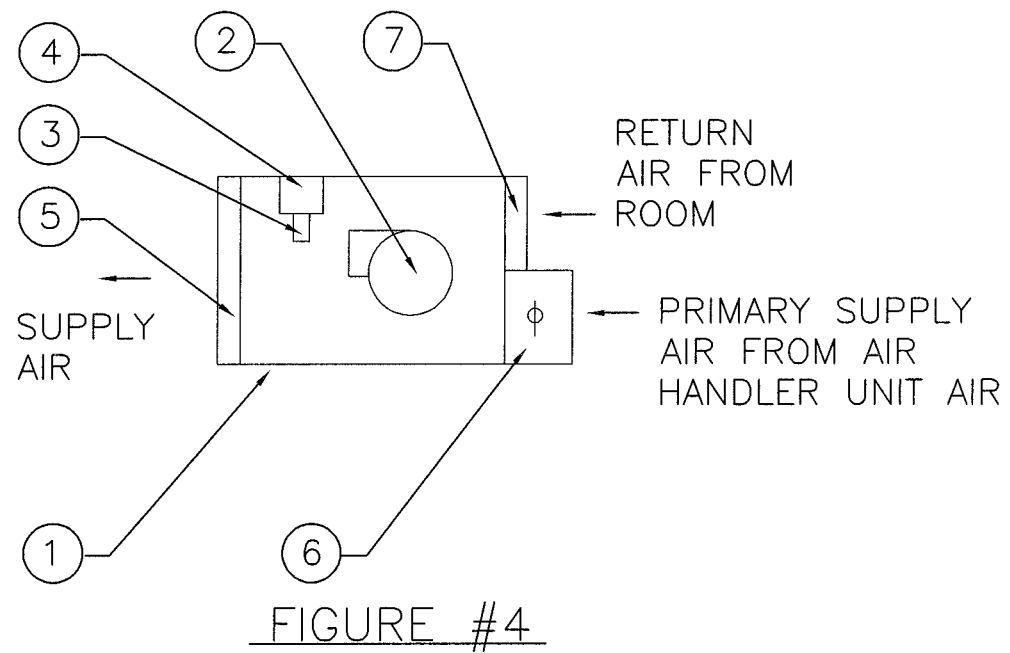
FIGURE #4

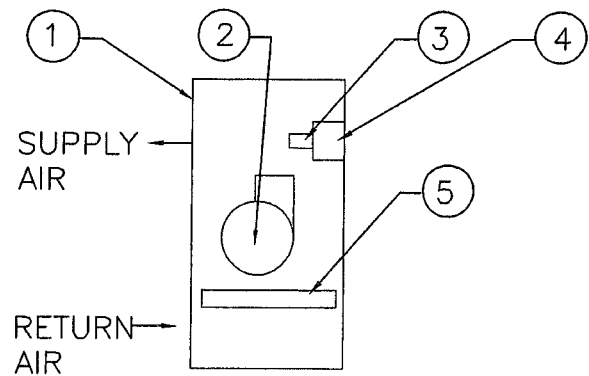
FIGURE #5
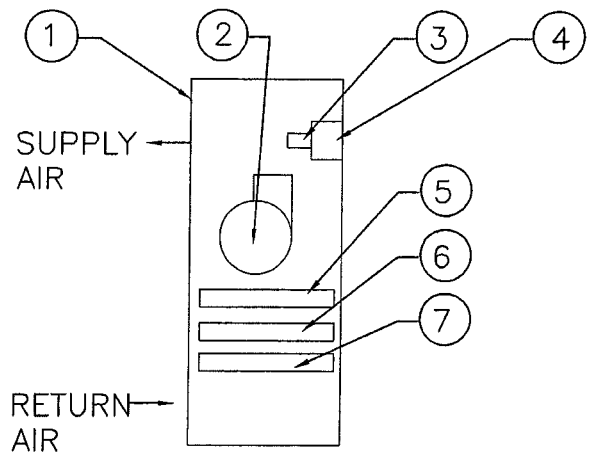
FIGURE #6

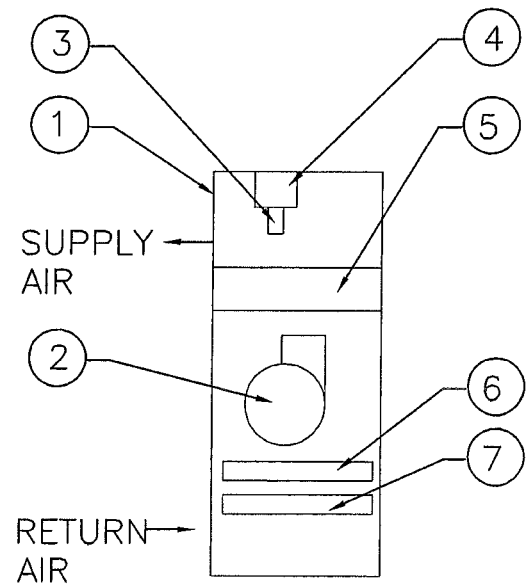
FIGURE #7
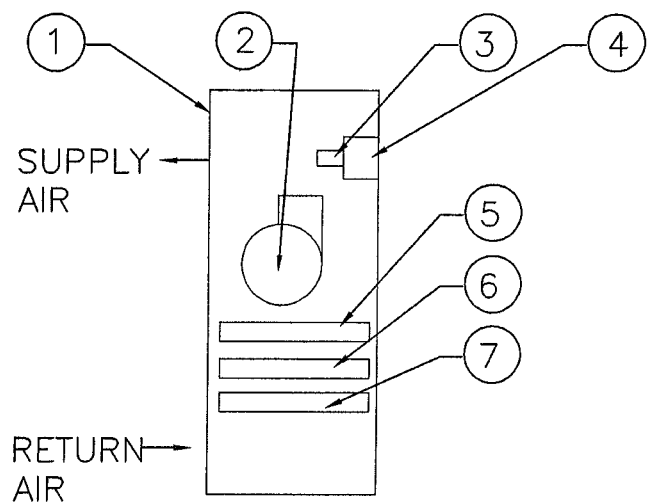
FIGURE #8

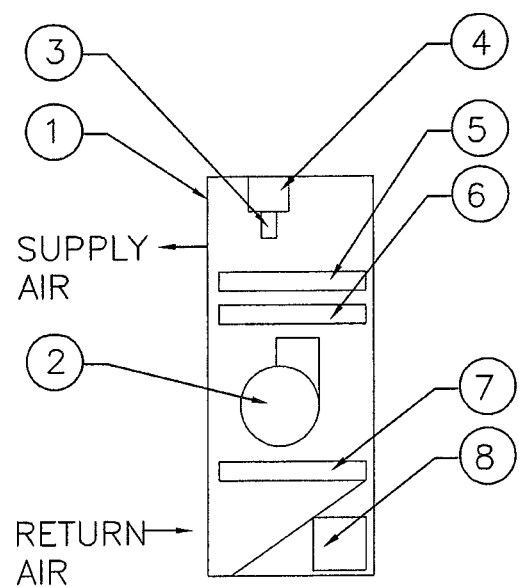
FIGURE #9

INTEGRATED BI-POLAR IONIZATION AIR PURIFICATION FOR FAN-POWERED AIR DISTRIBUTION DEVICES

CROSS-REFERENCE TO RELATED APPLICATION

This application claims the benefit of U.S. Provisional Application No. 61/586,399, filed Jan. 13, 2012, which is hereby incorporated by reference.

FIELD OF THE INVENTION

This invention is in the field of fan-powered air distribution devices.

BACKGROUND OF THE INVENTION

The HVAC system typically consumes 70% to 85% of a building's total energy usage. Much of this energy is used to condition air, heating, cooling and dehumidification. The other consideration is indoor environmental comfort. Because of tight building envelopes and non-operable windows, outside air has to be mechanically introduced into a building per code (ASHRAE 62) to control build-up of gaseous contaminants and provide acceptable air quality. This outside air needs to be conditioned, therefore increasing demands on the HVAC system, which consumes more energy and shortens equipment life, while running up the utility bill.

The major consideration of ASHRAE's 62 ventilation code is to provide acceptable air quality, to control contaminants by dilution or ventilation. Within the 62 code, ASHRAE also makes available an option to provide an engineered solution that allows the designer to reduce the ratio of outside air to re-circulated air, which then equates to decreased load requirements for the HVAC system, resulting in reduced energy and operating costs. This procedure, named the "IAQ Procedure", requires the designer to identify the typical contaminants that need to be controlled within the desired space and design an air cleaning strategy to control these contaminants within acceptable levels, as determined by recognized authorities. This presents a great opportunity for energy savings by reducing load demand on the HVAC system, which will result in first cost savings by equipment downsizing, and on-going energy savings due to reduced demand.

Indoor air quality in occupied spaces has been typically controlled by two methods: (1) mechanically introducing amounts of outdoor air in with the re-circulated air to dilute and control contaminants within the space; and (2) the use of filters.

The first method is the basis for the ASHRAE 62.1 standard which is titled "Ventilation for Acceptable Air Quality". However, the disadvantage of introducing outside air is that the outside air needs to be conditioned, heated, cooled and dehumidified in order for the building to maintain a proper comfort level. This added conditioning load requires additional energy. The largest energy demand in any building is typically HVAC, and outside load typically uses the most energy of the HVAC system. Also added load causes the HVAC systems to work harder, to require more maintenance, and to wear out faster.

Filters can be used remove particles from the air stream of the HVAC system. These unwanted particles are generated in spaces and also introduced by the outside air. The original intended use of standard filters was to protect the HVAC components from dirt and debris and premature wear. However, today's filters are designed for better control of contaminants and are thicker and pleated rather than flat to increase their surface area and catch more and smaller particles. Also, increasing air exchange rates from the HVAC system requires that more air be driven through the filter and increase its efficiency. The disadvantage is that all filters will restrict airflow to some degree and make the HVAC system work harder to condition the space for comfort. The higher efficiency filters result in more airflow restriction, and as the HVAC system works harder, it consumes more energy. Also, by increasing air exchange rates to drive more contaminants through a filter to maximize its efficiency, the HVAC system must work harder and consume more energy. Filters also require continual maintenance to replace dirty loaded filters.

Many manufacturers of unitary systems, fan powered boxes, etc. have attempted to develop feasible ways to offer improved air quality with their systems, but have been unsuccessful because of airflow restriction and load demands. The present invention provides a solution to these problems.

SUMMARY OF THE INVENTION

The invention, an improved indoor air distribution device/supply unit, includes but is not limited to a supply unit casing, a supply fan located inside the casing, and a bi-polar air purifier with ionization tube located in the air flow inside the casing.

In one embodiment, an indoor located air distribution device for delivering purified supply air to a service area is disclosed, including: a supply unit case; a supply fan positioned in the supply unit case for generating airflow inside the supply unit case; and a bi-polar air ionization purifier with ionization tube located in the airflow inside the supply unit case for generating an ionization area around the ionization tube; wherein the air ionization purifier is capable of ionizing oxygen molecules within the airflow that, as part of distribution supply air, pass by the ionization area to form into ionized oxygen clusters, which, as part of distribution supply air, purify the air in the service area.

The unit can be further equipped with filters, dampers, heating and cooling coils, mixing boxes, etc.

The present invention can infuse the supply air with bi-polar ions that interact with and reduce contaminants. Because the contaminants within the space are reduced, less outside air is required and more re-circulated air can be used. This reduces load and consumes less energy. Also, bi-polar ionization tube of the present invention does not impart any significant airflow restriction on the HVAC system, and therefore will consume less energy than using high efficiency filters to achieve improved indoor air quality. Also, the present invention does not require delivering the contaminants to the unit to be affected, but rather the ions are delivered to the space. Increased air exchange rate and increased energy costs as a result are not needed. The present invention works more effectively with lower air exchange rates which again will reduce energy consumption.

Also, the present invention only requires a once yearly maintenance to replace the bi-polar ion tube. Reducing outside air will help reduce HVAC system maintenance as filters will be less loaded with particles from the outside air and require fewer changes. Also, by reducing the load and reducing the airflow restriction, the HVAC system cycles less and has less wear and tear overall.

The present invention can be integrated for fan powered boxes, which are very sensitive to airflow restriction and increased load and cannot use high efficiency filters and increased volumes of outside air. The application of the present invention allows these systems to provide improved indoor air quality while still maintaining energy efficiency and lowered maintenance costs.

The present invention provides a revolutionary technology that can quickly fill an entire facility with crisp clean air. The present invention use nature's own cleaning method, Bi-Polar Ionization. This technology uses negative and positive ions (activated oxygen clusters) that interact with oppositely charged contaminants and reduce particulates, eliminate volatile organic compounds (VOC's) and odors and reduce airborne bacteria, viruses and germs. The proprietary science behind this innovation is a proven economical, efficient purification treatment for indoor air. The present invention significantly reduces ALL the contaminants found indoors, that people shouldn't be breathing.

The present invention is quite advantageous to design in an ASHRAE 62 IAQ Procedure strategy. The present invention can be implemented based on the calculations and reduction factors for the system design, which conforms to the 62 IAQ Procedure. The present invention is also a low energy usage product. For example, the largest commercial unit from AtmosAir (AA 500F) will only cost $65.90 per year in energy used (8760 hours of use @ US avg. electrical rate of $0.1105 per Kwh). The present invention has been independently tested at a performance at an 85.8% contaminant reduction. A comparable 86% efficient filter would cost $1,225.40 per year in energy used. This is due to the increased static pressure, resulting in reduced airflow from the filter and increased demand on the HVAC equipment. This makes the present invention a truly "green" product, providing the benefits more energy efficiently.

BRIEF DESCRIPTION OF THE DRAWINGS

FIG. 1—Schematic of indoor air distribution device/supply unit (fan-coil unit) with built-in air purifier.

FIG. 2—Schematic of indoor air distribution device/supply unit (unit ventilator) with built-in air purifier.

FIG. 3—Schematic of indoor air distribution device/supply unit (parallel flow fan powered VAV box) with built-in air purifier.

FIG. 4—Schematic of indoor air distribution device/supply unit (series flow fan powered VAV box) with built-in air purifier.

FIG. 5—Schematic of indoor air supply unit (cabinet unit heater) with built-in air purifier.

FIG. 6—Schematic of indoor air distribution device/supply unit (ductless DX/heat pump indoor unit) with built-in air purifier.

FIG. 7—Schematic of indoor air distribution device/supply unit (furnace unit) with built-in air purifier.

FIG. 8—Schematic of indoor air distribution device/supply unit (indoor air conditioner unit) with built-in air purifier.

FIG. 9—Schematic of indoor air distribution device/supply unit (self contained air conditioner/heat pump unit) with built-in air purifier.

DETAILED DESCRIPTION OF THE INVENTION

As discussed below, the present invention includes an integrated bi-polar ionization air purification system for fan-powered air distribution devices. In one embodiment, the system includes a bi-polar air ionization purifier with ionization tube, which can include the bipolar ionization tube as disclosed in U.S. Patent Application Publication No. 2010/0247389 to Abate, the disclosure of which is hereby incorporated by reference.

FIG. 1 is a schematic of an indoor air supply unit (fan-coil unit) with built-in air purifier. The unit includes a case 1, a supply fan 2, and an air purifier 3 with transformer and control 4, a combination of heating/reheat hot water or electric heat coils 5, a cooling direct-expansion (DX) or chilled water coil 6, a filter 7, a mixing box 8 with return air damper 9 and an outside air damper 10.

An air purifier ionization tube is located in the air flow. Location of the air purifier tube is variable according to the actual air supply unit's configuration. Energizing the ionization tube ionizes the oxygen molecules that pass by the ionization area of the tube. The oxygen molecules then form into ionized oxygen/air clusters. The ionized purified supply air is distributed into the service area and improves its indoor air quality by breaking down the airborne contaminants.

FIG. 2 is the schematic of the indoor air supply unit (unit ventilator) with built-in air purifier. The unit includes the case 1, supply fans 2, and an air purifier 3 with transformer and control 4, a combination of heating/reheat hot water or electric heat coils 5, a cooling DX or chilled water coil 6, and a filter 7.

An air purifier ionization tube is located in the air flow. Location of the air purifier tube is variable according to the actual air supply unit's configuration. Energizing the ionization tube ionizes the oxygen molecules that pass by the ionization area of the tube. The oxygen molecules then form into ionized oxygen/air clusters. The ionized purified supply air is distributed into the service area and improves its indoor air quality by breaking down the airborne contaminants.

FIG. 3 is the schematic of the indoor air supply unit (parallel flow fan powered VAV box) with built-in air purifier. The unit includes the case 1, a supply fan 2, and an air purifier 3 with transformer and control 4, heating hot water or electric heat coils 5, a primary supply air damper 6, and a return air filter 7. An air purifier ionization tube is located in the air flow. Location of the air purifier tube is variable according to the actual air supply unit's configuration. Energizing the ionization tube ionizes the oxygen molecules that pass by the ionization area of the tube. The oxygen molecules form into ionized oxygen/air clusters. The ionized purified supply air is distributed into the service area and improves its indoor air quality by breaking down the airborne contaminants.

FIG. 4 is the schematic of indoor air supply unit (series flow fan powered variable air volume (VAV) box) with built-in air purifier. The unit includes the case 1, a supply fan 2, and an air purifier 3 with transformer and control 4, heating hot water or electric heat coils 5, a cooling primary supply air damper 6, and a filter 7.

An air purifier ionization tube is located in the air flow. Location of the air purifier tube is variable according to the actual air supply unit's configuration. Energizing the ionization tube ionizes the oxygen molecules that pass by the ionization area of the tube. The oxygen molecules form into ionized oxygen/air clusters. The ionized purified supply air is distributed into the service area and improves its indoor air quality by breaking down the airborne contaminants.

FIG. 5 is the schematic of indoor air supply unit (cabinet unit heater) with built-in air purifier. The unit includes the case 1, a supply fan 2, and an air purifier 3 with transformer and control 4, heating hot water or electric heat coils 5. An air purifier ionization tube is located in the air flow. Location of the air purifier tube is variable according to the actual air supply unit's configuration. Energizing the ionization tube ionizes the oxygen molecules that pass by the ionization area of the tube. The oxygen molecules form into ionized oxygen/ air clusters. The ionized purified supply air is distributed into the service area and improves its indoor air quality by breaking down the airborne contaminants.

FIG. 6 is the schematic of indoor air supply unit (ductless direct-expansion (DX)/heat pump indoor unit) with built-in air purifier. The unit includes the case 1, a supply fan 2, and an air purifier 3 with transformer and control 4, combination of heating/reheat hot water or electric heat coils 5, cooling direct-expansion (DX) or chilled water coil 6, and a filter 7. An air purifier ionization tube is located in the air flow. Location of the air purifier tube is variable according to the actual air supply unit's configuration. Energizing the ionization tube ionizes the oxygen molecules that pass by the ionization area of the tube. The oxygen molecules form into ionized oxygen/air clusters. The ionized purified supply air is distributed into the service area and improves its indoor air quality by breaking down the airborne contaminants.

FIG. 7 is schematic of indoor air supply unit (furnace unit) with built-in air purifier. The unit includes the case 1, a supply fan 2, and an air purifier 3 with transformer and control 4, oil-fired or gas-fired heat exchanger 5, cooling direct-expansion (DX) or chilled water coil 6, and a filter 7. An air purifier ionization tube is located in the air flow. Location of the air purifier tube is variable according to the actual air supply unit's configuration. Energizing the ionization tube ionizes the oxygen molecules that pass by the ionization area of the tube. The oxygen molecules form into ionized oxygen/air clusters. The ionized purified supply air is distributed into the service area and improves its indoor air quality by breaking down the airborne contaminants.

FIG. 8 is schematic of indoor air supply unit (indoor air conditioner unit) with built-in air purifier. The unit includes the case 1, a supply fan 2, and an air purifier 3 with transformer and control 4, combination of heating/reheat hot water or electric heat coils 5, cooling direct-expansion (DX) or chilled water coil 6, and a filter 7. An air purifier ionization tube is located in the air flow. Location of the air purifier tube is variable according to the actual air supply unit's configuration. Energizing the ionization tube ionizes the oxygen molecules that pass by the ionization area of the tube. The oxygen molecules form into ionized oxygen/air clusters. The ionized purified supply air is distributed into the service area and improves its indoor air quality by breaking down the airborne contaminants.

FIG. 9 is schematic of indoor air supply unit (self contained air conditioner/heat pump unit) with built-in air purifier. The unit includes the case 1, a supply fan 2, and an air purifier 3 with transformer and control 4, combination of heating/reheat hot water or electric heat coils 5, cooling direct-expansion (DX) or chilled water coil 6, a filter 7, and a compressor assembly 8. An air purifier ionization tube is located in the air flow. Location of the air purifier tube is variable according to the actual air supply unit's configuration. Energizing the ionization tube ionizes the oxygen molecules that pass by the ionization area of the tube. The oxygen molecules form into ionized oxygen/air clusters. The ionized purified supply air is distributed into the service area and improves its indoor air quality by breaking down the airborne contaminants.

OPERATION

The air purifier ionization tube is located in the air flow area inside the air distribution device/supply unit case. In operation the bi-polar ion purification system (filter) is activated and creates an ionization area around ionization tube. The air moves around the ionization tube installed in the airflow. Oxygen molecules passing by the ionization area around the ionization tube are charged and form into ionized oxygen clusters. Ionized supply air agglomerates the air particles, provides air deodorization and mold, bacteria and viruses lose the ability to reproduce and are rendered "non viable". The ionized air supply seeks out volatile organic compounds and breaks down their complex hydrocarbon chains into simple harmless elements. The supply air with ionized oxygen clusters is distributed into the service area and improves its indoor air quality.

The above disclosure is intended to be illustrative and not exhaustive. This description will suggest many modifications, variations, and alternatives that may be made by those of ordinary skill in this art without departing from the scope of the invention. Those familiar with the art may recognize other equivalents to the specific embodiments described above. Accordingly, the scope of the invention is not limited to the foregoing specification and attached drawings.

What is claimed is:

1. An indoor located air distribution device for delivering purified supply air to a service area, comprising:
   a supply unit case;
   a supply fan positioned in the supply unit case for generating airflow inside the supply unit case; and
   a bi-polar air ionization purifier with ionization tube located in the airflow inside the supply unit case for generating an ionization area around the ionization tube;
   wherein the air ionization purifier is capable of ionizing oxygen molecules within the airflow that, as part of distribution supply air, pass by the ionization area to form into ionized oxygen clusters, which, as part of distribution supply air, purify the air in the service area.

2. The device of claim 1, further comprising an air mixing box positioned in the supply unit case for mixing outside air and return air.

3. The device of claim 1, further comprising a filter positioned in the supply unit case for removing contaminants from the airflow.

4. The device of claim 1, further comprising a return air damper positioned on the supply unit case.

5. The device of claim 1, further comprising an outside air damper positioned on the supply unit case.

6. The device of claim 1, further comprising a reheat and/or preheat hot water or electrical coil positioned in the supply unit case for generating hot air.

7. The device of claim 1, further comprising a chilled water or direct-expansion (DX) cooling coil positioned in the supply unit case for generating cold air.

8. The device of claim 1, wherein the indoor located air distribution device is a fan-coil.

9. The device of claim 1, wherein the indoor located air distribution device is a unit ventilator.

10. The device of claim 1, wherein the indoor located air distribution device is a cabinet unit heater.

11. The device of claim 1, wherein the indoor located air distribution device is a fan-powered variable air volume (VAV) box.

12. The device of claim 1, wherein the indoor located air distribution device is a ductless direct-expansion (DX) indoor unit.

13. The device of claim 1, wherein the indoor located air distribution device is a self-contained room mounted air conditioner and heat pump.

* * * * *